April 14, 1970  W. G. CROSS ET AL  3,505,818
GAS TURBINE ENGINE
Filed Oct. 20, 1967  4 Sheets-Sheet 1
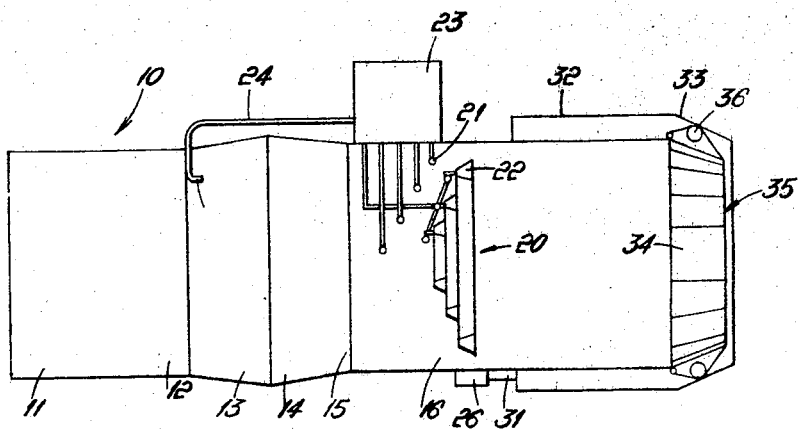
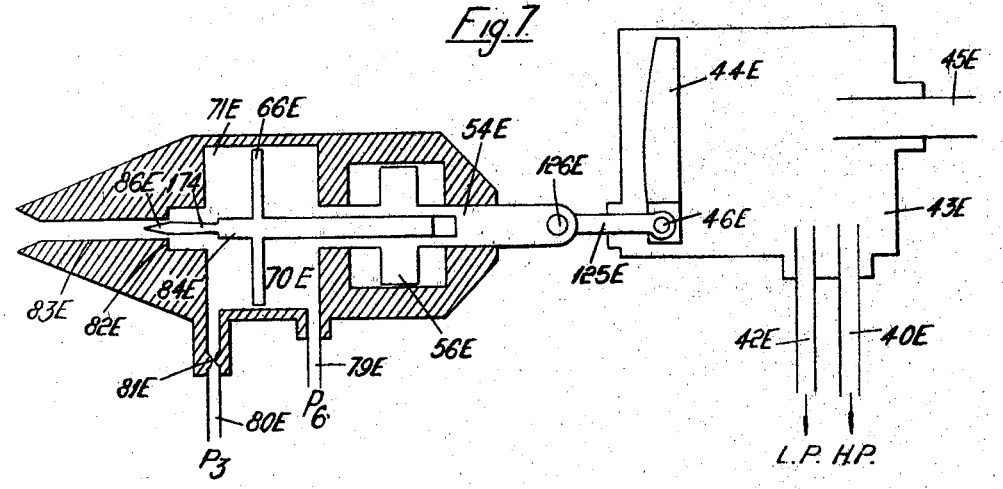
Inventors
Walter George Cross
William Ralph Coleman Ivens
By
Cushman, Darby & Cushman
Attorneys

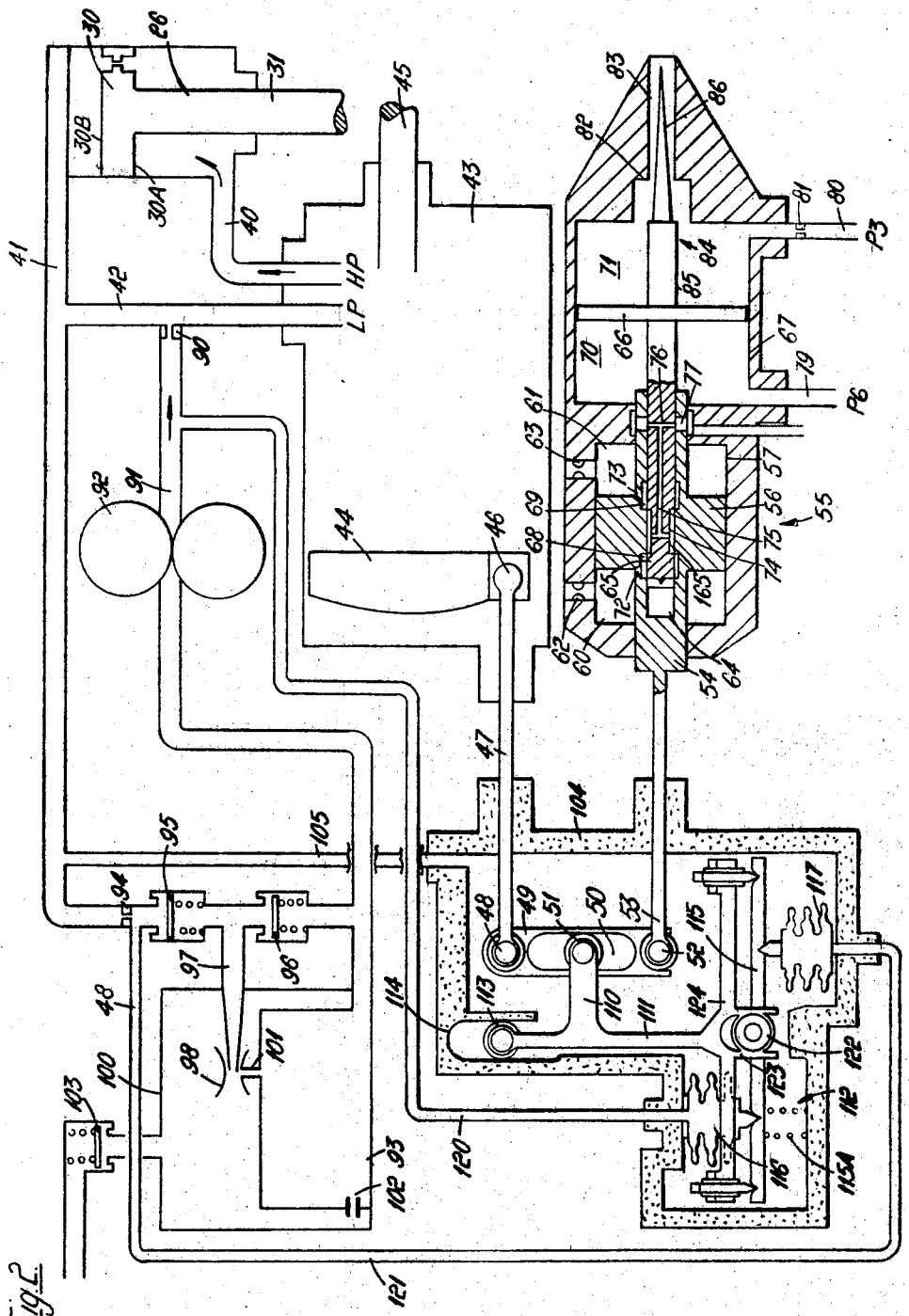

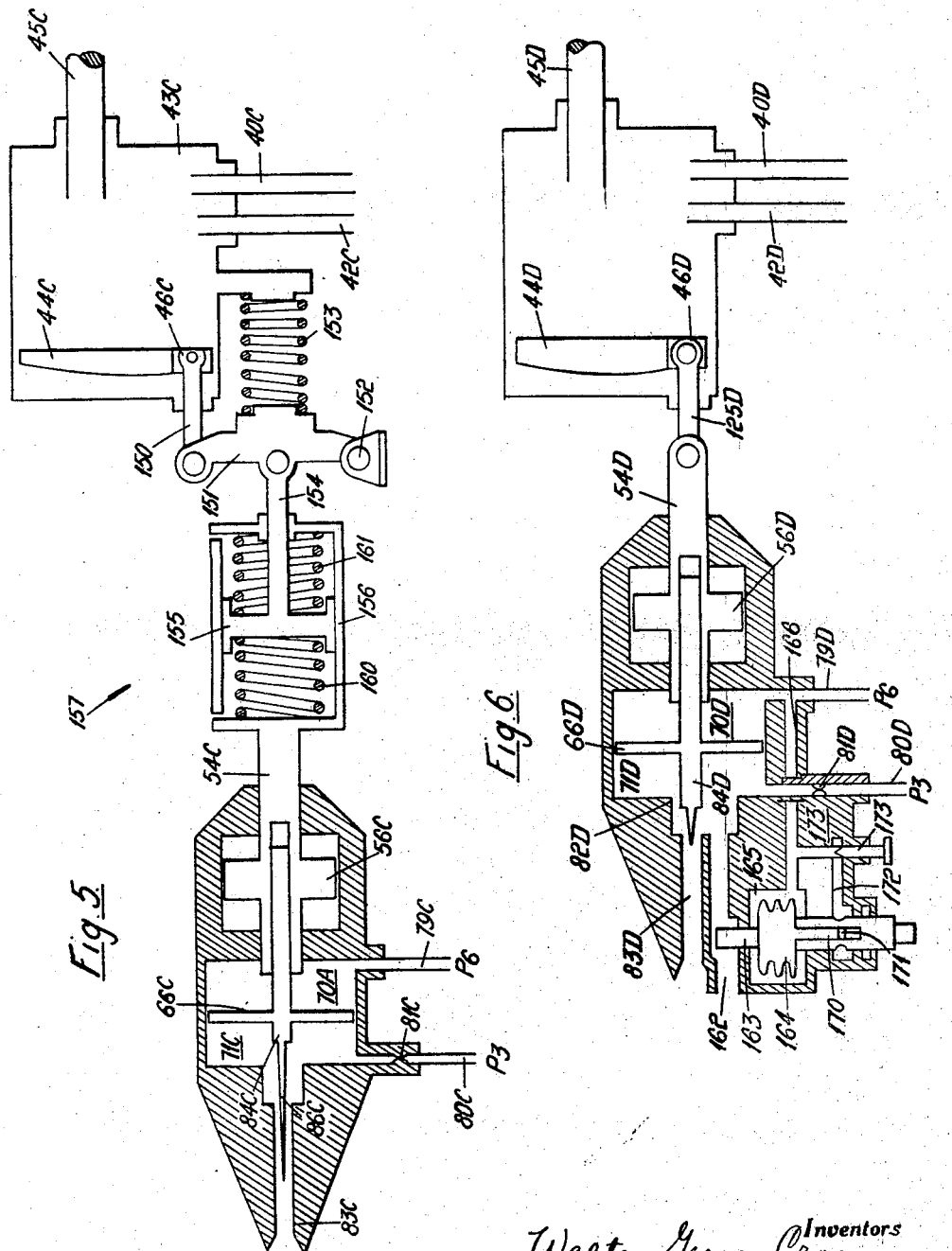

United States Patent Office 3,505,818
Patented Apr. 14, 1970

3,505,818
GAS TURBINE ENGINE
Walter George Cross and William Ralph Coleman Ivens, Derby, England, assignors to Rolls-Royce Limited, Derby, England, a British company
Filed Oct. 20, 1967, Ser. No. 676,813
Claims priority, application Great Britain, Nov. 16, 1966, 51,443/66
Int. Cl. F02k 1/18
U.S. Cl. 60—242   9 Claims

ABSTRACT OF THE DISCLOSURE

A gas turbine engine, having reheat combustion equipment, has a variable area nozzle which, on a predetermined variation in jet pipe pressure, has its area adjusted at a high initial speed which is subsequently reduced in order that stiction in the nozzle mechanical parts is overcome quickly.

---

Figure 3:
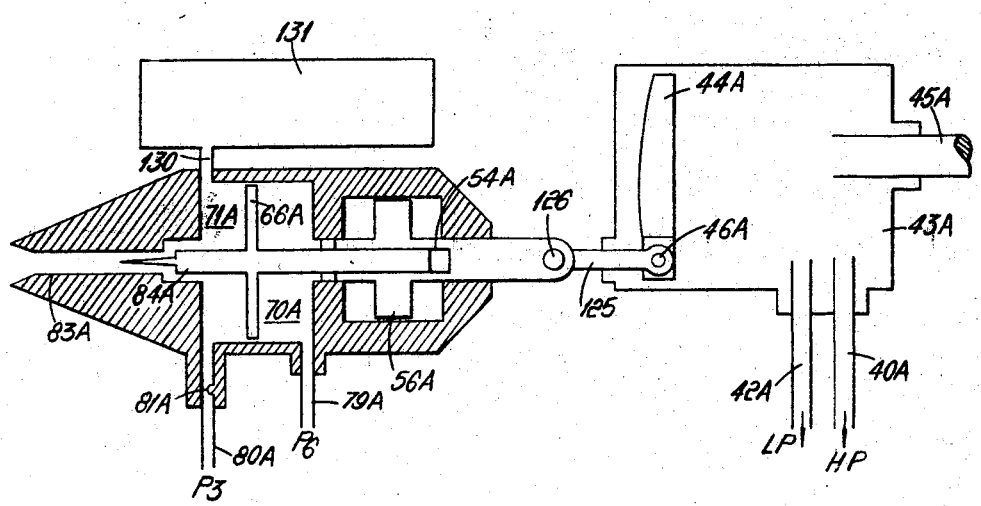

This invention concerns a gas turbine engine.

In gas turbine engines having adjustable area nozzles, it is a problem that "stiction" renders the force required to adjust the nozzle area inconsistent, with the result that the speed of response of the nozzle area control mechanism in response to charges in jet pipe pressure is also variable. Under some operating conditions this may give rise to poor control characteristics, and may even promote surging.

It is therefore an object of the present invention to provide a gas turbine engine having a variable area nozzle and in which the above problem caused by stiction may be overcome.

According to one aspect of the present invention, there is provided a gas turbine engine having a variable area nozzle, a power-operated device for varying the area of the nozzle, and a pressure responsive device responsive at least to a pressure functionally related to a pressure prevailing in the jet pipe of the engine, means to permit the pressure responsive member to undergo an initial displacement large in comparison to a predetermined variation in jet pipe pressure to cause the power-operated device to adjust the area of the nozzle to compensate for the said variation initially at a rate which is large by comparison with the change in the said jet pipe pressure, and means adapted to thereafter cause the pressure responsive member to recover to a position consistent with the change in jet pipe pressure, the rate at which the area of the nozzle is adjusted being gradually reduced with time.

Thus, in one embodiment there may be means defining two spaces which are respectively disposed on opposite sides of the pressure responsive device, the spaces being respectively open to pressures functionally related to a said jet pipe pressure and to a compressor pressure, the said means to permit comprising means defining a chamber of large volume compared to the space open to the pressure functionally related to the compressor pressure, a passage interconnecting the chamber with the said space.

In another embodiment there may be means defining two spaces which are respectively disposed on opposite sides of the pressure responsive device, the spaces being respectively open to pressure functionally related to the said jet pipe pressure and to a compressor pressure, a vent orifice communicating with the space open to the pressure functionally related to compressor pressure, said means to permit comprising a needle valve controlling the effective size of the orifice and being connected to the pressure responsive member, the needle valve having a cylindrical portion adjacent a conical end portion.

In another aspect there is provided a gas turbine engine having a variable area nozzle, at least one hydraulic ram for varying the area of the nozzle, and a pressure responsive device responsive at least to a pressure functionally related to a pressure prevailing in the jet pipe of the engine, opposite sides of the ram being connected across a pump whose output is varied under the control of the pressure responsive device, and control means to effect an additional control over the output of the pump in response to at least one hydraulic pressure difference which is affected by movement of the ram, the pressure responsive device and the additional control means being adapted on a predetermined variation in the jet pipe pressure to cause the power-operated device to adjust the area of the nozzle to compensate for the said variation, the ram initially moving the nozzle at a rate which is large by comparison with the change in the said jet pipe pressure, the rate at which the area of the nozzle is adjusted being gradually reduced with time.

It will be appreciated that the invention is of value in a gas turbine engine having reheat combustion equipment, since it is important in such an engine that the area of the variable area nozzle should be swiftly adjusted once the reheat combustion equipment is brought into operation.

There may be a vent passage which communicates with the space open to the pressure functionally related to compressor pressure, a valve being provided which controls flow through the vent passage and which is itself temporarily opened on an increase in jet pipe pressure. Thus, the pressure responsive device may be connected to the valve by means including a resilient connection which initially cause the valve to move in unison with the pressure responsive device when the latter is moved as a result of an increase in jet pipe pressure.

The valve may be moved by a bellows which is arranged to be responsive to variations in jet pipe pressure.

The pump is preferably a swash plate pump the inclination of whose swash plate is adjusted by the servo device.

Thus, the servo device may be connected to the swash plate by means including a lever having a movable fulcrum, the means responsive to hydraulic pressure moving the fulcrum to increase the output of the pump on movement of the said ram or rams.

Alternatively the swash plate may be urged towards a given position, the servo device being connected to the swash plate by means including a resilient connection which, on a increase in jet pipe pressure, initially move the swash plate away from said given position so as to effect rapid opening of the nozzle.

The invention is illustrated, merely by way of example, in the accompanying drawings, in which:

FIGURE 1 is a diagrammatic view of a gas turbine engine, according to the present invention, having a variable area nozzle, FIGURE 2 is a diagrammatic view of a mechanism for adjusting the area of the said variable area nozzle, and FIGURES 3 to 7 illustrate various alternative embodiments of such a mechanism.

Terms such as "left," "right," "upper" and "lower," as used in the description below, are to be understood to refer to directions as seen in the drawings.

In FIGURE 1 there is shown a gas turbine engine 10 which is adapted for use as a forward propulsion engine of an aircraft and which comprises in flow series a low pressure compressor 11, a high pressure compressor 12, main combustion equipment 13, a high pressure turbine 14, and a low pressure turbine 15, the turbine exhaust gases passing to atmosphere through a jet pipe 16.

Reheat combustion equipment 20, which includes main burners 21 and pilot burners 22, is mounted in the jet pipe 16. The burners 21, 22 are supplied with reheat fuel from a reheat fuel system 23. The reheat fuel system 23 also provides, when required, a flow of fuel via a passage 24 to hot streak injectors 25. The fuel supplied to the injectors 25 is injected into the main combustion equipment 13 and is passed through the turbines 14, 15 as a "hot streak" to effect ignition of the reheat fuel supplied to the pilot burners 22.

Mounted about the jet pipe 16 are a plurality of (e.g. six) of double-acting nozzle rams 26. In order, however, to simplify both the description and the drawings, only one ram 26 is shown and will be described.

The ram 26 has a piston 30 (FIGURE 2) whose piston rod 31 is connected to an axially movable sleeve 32 which is mounted concentrically about the downstream end of the jet pipe 16.

The sleeve 32 has a frusto-conical downstream end 33 which tapers in a downstream direction. The downstream end of the jet pipe 16 is provided with a plurality of pivotally mounted nozzle members or "fingers" 34 which collectively constitute a variable area nozzle 35. Each of the nozzle members 34 is provided with a roller 36 which engages the downstream end 33 of the sleeve 32.

Accordingly, when the ram 26 causes axial movement of the sleeve 32 in a downstream direction, the nozzle members 34 will be able to move radially outwardly under the force of the jet gases so as to increase the effective area of the nozzle 35, while axial movement of the sleeve 32 in an upstream direction will force the nozzle members 34 radially inwardly so as to decrease the effective size of the nozzle 35.

Opposite sides 30A, 30B of the piston 30 of the ram 26 respectively communicate by way of a high pressure conduit 40 and by way of low pressure conduits 41, 42 with the high pressure and low pressure sides respectively of a swash plate pump 43. The swash plate pump 43, which is illustrated only very diagrammatically, has a swash plate 44 which is pivotally mounted, by means not shown, on an engine driven shaft 45. The inclination of the swash plate 44 controls the stroke of pistons (not shown) of the pump 43 and therefore controls the output thereof and hence the power supplied to the ram 26. An increase in the output of the pump 43 effects closing of the nozzle, whereas a decrease in the pump output allows the nozzle to open due to the pressure of the turbine exhaust gases thereon.

The swash plate 44 is pivotally connected at 46 to one end of an axially movable link 47, the other end of the link 47 being pivotally connected at 48 to the upper end of a lever 49. The lever 49 has a slot 50 therein which provides a track for a roller 51 which forms a movable fulcrum for the lever 49. The lower end of the lever 49 is pivotally connected at 52 to an axially movable link 53 which is secured to a sleeve 54 which forms part of a servo device 55.

Mounted on the sleeve 54 is a servo piston 56 which is slidably mounted in a cylinder 57 within which there are spaces 60, 61 which are divided from each other by the piston 56. The spaces 60, 61 are supplied, by means which are not shown in detail but which include restricted passages 62, 63 respectively, with high pressure fuel which has been pressurized by an engine driven fuel pump (not shown).

The sleeve 54 has a bore 64 within which there is slidably mounted a rod 65 a portion of which extends outwardly of the right hand end of the sleeve 54. Mounted on this portion of the rod 65 is a piston 66. The piston 66 is slidably mounted in a cylinder 67 and separates from each other two spaces 70, 71 therein.

The sleeve 54 is provided with axially spaced drillings 72, 73 which communicate via annular recesses 68, 69 respectively, with the bore 64, and which also communicate with the spaces 60, 61 respectively. The rod 65 is provided with a recess 74 whose axial length is the same as the axial spacing between the annular recesses 68, 69. The recess 74 communicates with an axial passage 75 through the rod 65, the axial passage 75 communicating by way of a radial drilling 76 with an outlet 77 leading, by means not shown, to the low pressure side of the said engine driven fuel pump.

It will therefore be appreciated that if the piston 66 is moved towards the left, this will bring the recess 74 into communication with the annular recess 68 and drilling 72, and will therefore cause high pressure fuel to flow from the space 60 and via the drilling 72, annular recess 68, recess 74, axial passage 75, radial drilling 76 and outlet 77 to the low pressure side of the said engine driven fuel pump. The pressure in the space 60 will therefore become less than that in the space 61 and the piston 56 will therefore move towards the left until such time as the drilling 72 ceases to be in communications with the recess 74. Thus movement of the piston 66 towards the left cause similar leftward movement of the piston 56.

Similarly, if the piston 66 moves towards the right, the recess 74 will be brought into communication with the annular recess 69 and drilling 73. The pressure in the space 61 will therefore become lower than that in the space 60, whereby the piston 56 will be moved towards the right until such time as the drilling 73 is no longer in communication with the recess 74. When this happens, the piston 56 will have moved towards the right a distance equal to that through which the piston 66 has moved.

The space 70 is supplied by way of a conduit 79 with air at a pressure functionally related to the pressure $P_6$ prevailing in the jet pipe 16. The space 71 is supplied, by way of a conduit 80 containing a restriction 81, with air at a pressure functionally related to the pressure $P_3$ prevailing at the downstream end of the high pressure compressor 12.

The position of the piston 66, and hence of the piston 56, will thus depend on the value of the ratio $P_3/P_6$, and the value of this ratio will thus control the inclination of the swash plate 44 and hence the output of the pump 43. Thus, if the pressure $P_6$ increases by reason of the reheat combustion equipment 20 being brought into operation, the piston 66 and the piston 56 will move towards the right, the link 47 will move towards the left, and the resulting pump flow in the side 30A of the piston 30 of the ram 26 will decrease which will thus increase the effective area of the variable area nozzle 35. This will ultimately restore the $P_3/P_6$ ratio to a desired value, and when this occurs further movement of the ram 26 will stop.

The space 71 communicates at a vent orifice 82 with a vent passage 83 leading to atmosphere. Mounted within the vent passage 83, so as to control the effective size of the vent orifice 82, is a needle valve 84 which forms an extension of the rod 65 and which is thus connected to the piston 66 for positioning thereby. The needle valve 84 has a conical end portion 86 of very gradual taper and thus relatively small changes in $P_3/P_6$ cause relatively large movements of the needle valve 84.

The low pressure conduit 42 communicates by way of a restriction 90 with a conduit 91 which leads to a backing pump 92 which is arranged to pump the oil at a substantially constant rate through the conduit 91 from an oil tank 93.

The low pressure conduit 41 communicates by way of a restriction 94 and spaced non-return valves 95, 96 with the conduit 91. A duct 97, which communicates with the low pressure conduit 41 between the non-return valves 95, 96, extends to the throat of a venturi 98 mounted within a chamber 100 within which the oil tank 93 is disposed. The throat of the venturi 98 also communicates via a duct 101 with the interior of the oil tank 93 so that, whenever there is a flow of oil through the duct 97, oil and air will be drawn from the oil tank 93 into the chamber 100. The chamber 100 communicates via a passage 102 with the oil tank 93, and is pressurised by compressed air (supplied by means not shown), the pressure within the chamber 100 being limited by a blow-off valve 103.

The lever 49 is mounted in a sealed housing 104 in which the links 47, 53 are slidably mounted. The interior of the housing 104 is filled with oil which is withdrawn from the low pressure conduit 41 by way of a pipe 105.

The roller 51 is carried by an arm 110 which extends at right angles from an arm 111 of a bellows device 112. The arm 111 is provided at its upper end with a roller 113 which may roll in a track formed by a recess 114 in the housing 104.

The bellows device 112 comprises a beam 115 which is pivotally mounted in the housing 104. The left hand upper side and the right hand lower side of the beam 115 are respectively engaged by bellows 116, 117. A spring 115A is provided to urge the left hand upper side of the beam 115 into contact with the bellows 116. The interior of the bellows 116 communicates by way of a duct 120 with the portion of the conduit 91 disposed between the restriction 90 and the backing pump 92. The interior of the bellows 117 communicates, by way of a passage 121, with the low pressure conduit 41 immediately downstream of the restriction 94. It will be appreciated, therefore, that bellows 116 is responsive to changes in the presure difference across the restriction 90, while the bellows 117 is responsive to changes in the pressure difference across the restriction 94.

The pivot on which the beam 115 is mounted is provided with a roller 122 which forms a guide for a track 123. The track 123 is carried by a beam 124 which is disposed parallel to and spaced from the beam 115. The beam 124 is secured to the arm 111.

Pivotal movement of the beam 115 in either direction from the horizontal position shown thus causes upward movement of the beam 124 and arm 111, thereby moving the roller 51 which forms the fulcrum of the lever 49.

The arrangement is thus such that if the jet pipe pressure $P_6$ should rise, as a result, for example, of the reheat combustion equipment 20 being brought into operation, the needle valve 84 having a very gradual taper and consequently very high gain will permit the piston 66 to be moved swiftly a relatively large distance towards the right, so as to cause rapid adjustment of the output of the swash plate pump 43, whereby the frictional forces which tend to prevent movement of the ram 26 will be rapidly overcome. However, immediately the ram 26 starts to move in the direction of opening the nozzle 35, there will be a net inflow of oil into the ram 26 due to the unequal swept volumes on opposite sides of the piston 30. The flow of oil through the restriction 94 in the low pressure conduit 41 is thus reduced, thereby decreasing the pressure drop across the restriction 94, and therefore, across the bellows 117. The bellows 117 thus expands, causing the beam 115 to pivot. Moreover, the beam 124 rises, thus moving the roller 51 which forms the fulcrum of the lever 49. The stroke of the pump 43 is thus increased, which in turn increases the rate at which oil is supplied to the ram 26, so that the final movement of the ram 26 takes place more slowly. The bellows 116 acts merely to adjust the datum position of the beam 115 in response to small changes in the oil flow through the restriction 90.

In FIGURE 3 there is shown an alternative embodiment of the present invention, many of whose parts are similar to those shown in FIGURE 2, and which will not therefore be described in detail, similar parts being given the same reference numerals as in FIGURE 2 with the addition of the suffix A.

In the FIGURE 3 embodiment, however, the swash plate 44A is connected at 46A to a link 125 which is pivotally connected at 126 to the sleeve 54A. Thus there is no equivalent in the FIGURE 3 construction of the swash plate 44A being connected to the servo piston 56A by means including a lever having a movable fulcrum which is moved immediately the ram 26 starts to move so as to reduce the rate at which the ram is moved.

Instead, in the FIGURE 3 construction, the space 71A, which is supplied with air at a pressure functionally related to the pressure $P_3$, communicates by way of a passage 130 with a large chamber 131.

If, therefore, there is a small increase in the pressure $P_6$, the piston 66A will move further to the left in the first instance than it would have done if the chamber 131 were not provided and will recover to an equilibrium position shortly thereafter. Thus, the movement of the swash plate 44A will be in phase advanced relationship with the change in the pressure $P_6$. That is to say due to the chamber 131, the area of the nozzle 35 will initially be adjusted by the piston 66A at a rate which is large by comparison with the change in the jet pipe pressure $P_6$, but the rate at which the area of the nozzle 35 will thereafter be adjusted will be gradually reduced with time. Thus the chamber 131 permits adjustment of the instantaneous pressure ratio prevailing across the piston 66A.

If desired, a non-return valve (not shown) may be provided adjacent the passage 130. If this is done, and engine surging occurs with the result that the pressure $P_3$ collapses, the provision of this non-return valve can ensure that the pressure in the space 71A also swiftly declines, and thus permits opening of the nozzle 35 rapidly.

Figure 4:
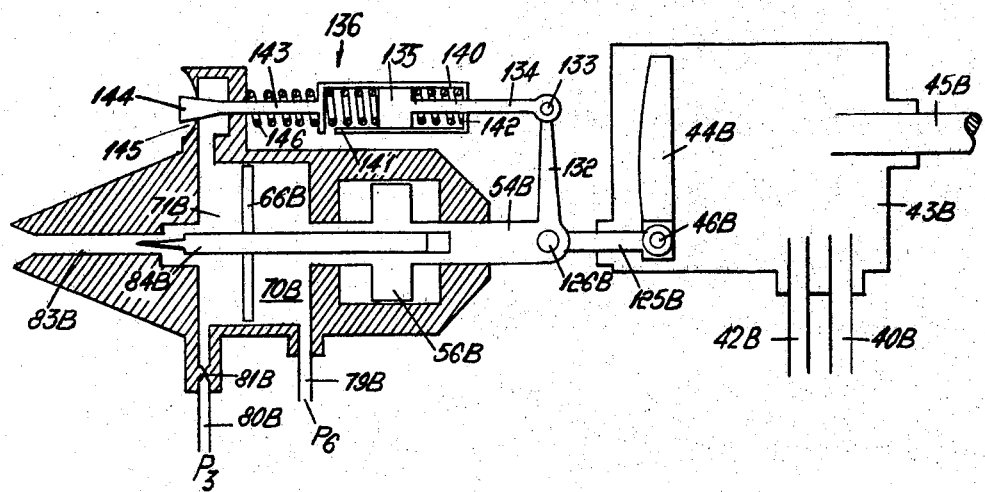

The construction of the embodiment of FIGURE 4 is generally similar to that of FIGURE 3, and will not therefore be described in detail, similar parts being given the same reference numerals with the addition of the suffix B.

In the FIGURE 4 construction, however, the sleeve 54B has an arm 132 which is pivotally connected at 133 to a rod 134 of a piston 135 of a dashpot device 136. The piston 135 is slidably mounted in a cylindrical body 140 of the dashpot device 136 and is urged towards a central position therein by means of springs 141, 142.

A valve rod 143, which carries a valve 144, is connected to the body 140, the valve 144 controlling flow through a vent passage 145 which communicates with the space 71B. The rod 143 is concentrically surrounded by a spring 146 which bears against the body 140 so as to urge the valve 144 towards the closed position.

If, therefore, there should be a rise in the pressure $P_6$ and the piston 66B in consequence moves towards the left, the piston 135 will also move towards the left, and initially there will be similar leftward movement of the body 140, and therefore of the valve 144, in unison with that of the piston 66B. The pressure in the space 71B will therefore fall and there will thus be greater travel of the piston 66B, with consequent adjustment of the swashplate 44B, than would otherwise be the case. After this initial opening of the valve 144, however, the spring 146 will move the body 140 so as to close the valve 144 in a time determined by the dashpot device 136.

In FIGURE 5 there is shown yet another embodiment which has parts generally similar to those of FIGURES 2 to 4 and which will not therefore be described in detail, like parts being given the same reference numerals with the addition of the suffix C.

In the FIGURE 5 embodiment, however, the space 71C does not communicate with a chamber 131 as in FIGURE 3, or with a vent passage 145 as in FIGURE 4.

The swash plate 44C, however, is connected at 46C to one end of a link 150 whose other end is pivotally connected to a beam 151. The other end of the beam 151 is mounted on a fixed pivot 152, a spring 153 engaging the beam 151.

The beam 151 is pivotally connected to a rod 154 of a piston 155. The piston 155 is slidably mounted in a cylindrical body 156 of a dashpot device 157, the piston 155 being centered within the dashpot device 157 by means of springs 160, 161. The body 156 is directly connected to the sleeve 54C.

The needle valve 84C, moreover, of the FIGURE 5 embodiment, is provided with a conical portion 86C having a more gradual taper than in the embodiments of FIGURES 3 and 4.

As will be appreciated, if there should be an increase in the pressure $P_6$, this will move the piston 66C and hence the servo piston 56C rapidly towards the left, and initially there will be full corresponding movement of the swash plate 44C against the action of the spring 153. Thus the increase in the area of the nozzle 35 will be at a large rate compared to the change in the pressure $P_6$ but after a period of time determined by the dashpot device 157, the spring 153 will reduce the speed of opening movement of the nozzle 35.

Yet a further embodiment of the invention is shown in FIGURE 6, the parts shown in FIGURE 6 which are similar to those of the other embodiments being given the same reference numerals with the addition of the suffix D.

In the FIGURE 6 embodiment, the sleeve 54D is directly connected by way of a link 125D with the swash plate 44D, but the space 71D, in addition to communicating with the vent orifice 82D whose effective size is controlled by the needle valve 84D, also communicates with a vent passage 162 the flow through which is controlled by a valve 163.

The valve 163 is moved by a bellows 164, the bellows 164 being mounted within a bellows chamber 165. The bellows chamber 165, and thus the exterior of the bellows 164, is open to the pressure $P_6$ by reason of the bellows chamber 165 communicating with the duct 79D by way of a duct 166.

The interior of the bellows 164 communicates with the interior of a pipe 170 to which the bellows 164 is secured. The pipe 170 has radial drillings 171 therein, which communicate with ducting 172. The ducting 172 communicates with the duct 166 and has a restrictor 173 therein. Thus, the interior of the bellows 164 is, by way of the restrictor 173, also open to the pressure $P_6$. Thus if there is a change in the value of the pressure $P_6$, the pressure outside the bellows 164 will change immediately, whereas that inside the bellows 164 will change to the new value in a time determined by the restrictor 173.

If, therefore, there should be an increase in the pressure $P_6$, this will initially cause opening of the valve 163 so as to increase the extent to which the piston 66D will move towards the left. There will thus be rapid initial opening of the nozzle 35. However, the pressures internally and externally of the bellows 164 will ultimately stabilize in relation to each other, so that the final position of the piston 66D will depend accurately upon the ratio $P_3/P_6$, whereby the area of the nozzle 35 will be correctly adjusted.

Still a further embodiment of the invention is shown in FIGURE 7 which has parts generally similar to those of FIGURE 3. The FIGURE 7 construction will not therefore be described in detail, the parts thereof which are similar to those of FIGURE 3 being given the same reference numerals with the addition of the suffix E.

In the FIGURE 7 embodiment, however, the passage 130 and chamber 131 of FIGURE 3 are not employed and, instead, the needle valve 84E has cylindrical or "parallel" portion 174 of infinite gain, which is disposed immediately adjacent to the conical end portion 86E of the needle valve 84E, the portion 86E being of fairly rapid taper with a relatively low gain.

The needle valve 84E is arranged so that when the $P_3/P_6$ ratio is within a normal range of values, the effective size of the vent orifice 82E is controlled by the conical end portion 86E of the needle valve 84E. However, if this pressure ratio should be reduced, i.e. towards surge, by reason, for example, of a rise in the pressure $P_6$, this will cause the needle valve 84E to move towards the left, with the result that the effective size of the vent orifice 82E is controlled by the cylindrical portion 174 of the needle valve 84E and not by the conical portion thereof. Accordingly, any further reduction in the ratio $P_3/P_6$ will result in full leftward travel of the needle valve 84E since the position of the cylindrical portion 174 in the vent passage 83E has negligible effect on the value of the pressure in the space 71E. This arrangement helps to ensure that when the $P_3/P_6$ pressure ratio is so reduced, the pump 43E will swiftly cause the ram 26 to start to increase the area of the nozzle 35. As soon as the nozzle 35 has opened to the required area, the $P_3/P_6$ ratio will be re-established at its normal value, and the needle valve 84E will revert to its normal position, i.e. with the conical end portion 86E thereof working in the vent orifice 82E.

We claim:

1. A gas turbine engine having a variable area nozzle, a power-operated device for varying the area of the nozzle, and a pressure responsive device responsive at least to a pressure functionally related to a pressure prevailing in the jet pipe of the engine, means to permit the pressure responsive member to undergo an initial displacement large in comparison to the predetermined variation in jet pipe pressure to cause the power-operated device to adjust the area of the nozzle to compensate for the said variation initially at a rate which is large by comparison with the change in the said jet pipe pressure, and means adapted to thereafter cause the pressure responsive member to recover to a position consistent with the change in jet pipe pressure, the rate at which the area of the nozzle is adjusted being gradually reduced with time.

2. An engine as claimed in claim 1 comprising means defining two spaces which are respectively disposed on opposite sides of the pressure responsive device, the spaces being respectively open to pressures functionally related to the said jet pipe pressure and to a compressor pressure, and said means to permit comprising means defining a chamber of large volume compared to the space open to the pressure functionally related to the compressor pressure, a passage interconnecting the chamber with the said space.

3. An engine as claimed in claim 1 comprising means defining two spaces which are respectively disposed on opposite sides of the pressure responsive device, the spaces being respectively open to pressure functionally related to the said jet pipe pressure and to a compressor pressure, a vent orifice communicating with the space open to the pressure functionally related to compressor pressure, and said means to permit comprising a needle valve controlling the effective size of the orefice and being connected to the pressure responsive member, the needle valve having a cylindrical portion adjacent a conical end portion.

4. A gas turbine engine having a variable area nozzle, at last one hydraulic ram for varying the area of the nozzle, and a pressure responsive device responsive at least to a pressure functionally related to a pressure prevailing in the jet pipe of the engine, with opposite sides of said ram being connected across a pump whose output is varied under the control of said pressure responsive device, and control means to effect an additional control over the output of the pump in responsive to at least one hydraulic pressure difference which is affected by movement of the ram, the pressure responsive device and the additional control means being adapted on a predetermined variation in the jet pipe pressure to cause the power-operated device to adjust the area of the nozzle to compensate for the said variation, the ram initially moving the nozzle at a rate which is large by comparison with the change in the said jet pipe pressure, the rate at which the area of the nozzle is adjusted being gradually reduced with time.

5. An engine as claimed in claim 4 comprising means defining a vent passage which communicates with the space open to the pressure functionally related to compressor pressure, a valve being provided which controls flow through the vent passage, and means to temporarily open the valve on an increase in jet pipe pressure.

6. An engine as claimed in claim 5 in which the pressure responsive device is connected to the valve by means including a resilient connection adapted to initially move the valve in unison with the pressure responsive device when the latter is moved as a result of an increase in jet pipe pressure.

7. An engine as claimed in claim 5 in which the valve is moved by a bellows which is arranged to be responsive to variations in jet pipe pressure.

8. An engine as claimed in claim 4 in which the pump is a swash plate pump the servo device being connected to the swash plate of the pump by means including a lever having a movable fulcrum, the means responsive to hydraulic pressure difference moving the fulcrum to increase the output of the pump by adjusting the inclination of the swash plate on movement of the said at least one ram.

9. An engine as claimed in claim 4 in which the pump is a swash plate pump, means being provided to urge the swash plate of the pump towards a given position, and means including a resilient connection to initially move the swash plate away from said given position so as to effect rapid opening of the nozzle upon an increase of jet pipe pressure.

References Cited

UNITED STATES PATENTS

| | | | |
|---|---|---|---|
| 2,936,579 | 5/1960 | Reed | 60—242 |
| 2,936,581 | 5/1960 | Williams | 60—242 |
| 2,987,877 | 6/1961 | Torell | 60—242 X |
| 3,016,696 | 1/1962 | Bryant | 60—242 |

AL LAWRENCE SMITH, Primary Examiner